United States Patent [19]
Ito et al.

[11] Patent Number: 6,042,349
[45] Date of Patent: Mar. 28, 2000

[54] FUEL SUPPLY DEVICE

[75] Inventors: Motoya Ito, Hekinan; Takeshi Matsuda, Anjo, both of Japan

[73] Assignee: Denso Corporation, Kariya, Japan

[21] Appl. No.: 09/167,541

[22] Filed: Oct. 7, 1998

[30] Foreign Application Priority Data

Oct. 14, 1997 [JP] Japan .................................. 9-280846

[51] Int. Cl.[7] .................................................. F04B 17/03
[52] U.S. Cl. ...................................................... 417/423.7
[58] Field of Search ........................ 417/423.7; 310/65 R

[56] References Cited

U.S. PATENT DOCUMENTS

| | | | |
|---|---|---|---|
| 4,588,933 | 5/1986 | Sun | 318/254 |
| 4,955,790 | 9/1990 | Nakanishi et al. | 417/45 |
| 4,998,865 | 3/1991 | Nakanishi et al. | 417/423.7 |
| 5,015,159 | 5/1991 | Mine et al. | 417/423.7 |
| 5,053,664 | 10/1991 | Kikuta et al. | 417/423.7 |
| 5,356,272 | 10/1994 | Nagata et al. | 417/423.7 |
| 5,593,287 | 1/1997 | Sadakata et al. | 417/366 |

FOREIGN PATENT DOCUMENTS

| | | |
|---|---|---|
| 6-311762 | 11/1994 | Japan . |
| 7-189843 | 7/1995 | Japan . |
| 10-136684 | 5/1998 | Japan . |

*Primary Examiner*—Erick R. Solis
*Attorney, Agent, or Firm*—Nixon & Vanderhye P.C.

[57] ABSTRACT

A fuel supply device is composed of a rotary pump, a brush-less motor having a stator and a rotor connected to the rotary pump and a circuit unit for supplying drive current to the brush-less motor. The circuit unit has a plurality of one-chip IC units on which a plurality of switching transistors and a circuit for detecting position of the rotor are integrally formed. The stator has a plurality of phase coils each of which is connected to one of the switching transistors of each of the one-chip IC units to be supplied with divided portion of the drive current from one of the switching transistors. Each of the phase coils is divided to a plurality of parallel coils having the same phase and each of the parallel coils is connected to one of the switching transistors.

4 Claims, 7 Drawing Sheets

FUEL SUPPLY DEVICE

CROSS REFERENCE TO RELATED APPLICATION

The present application is based on and claims priority from Japanese Patent Application No. Hei 9-280846 filed on Oct. 14, 1997, the contents of which are incorporated herein by reference.

BACKGROUND OF THE INVENTION

1. Field of the Invention

The present invention relates to a fuel supply device that supplies a fuel injection system or a carburetor with pressured fuel and, particularly, to a fuel pump having a brushless motor.

2. Description of the Related Art

A fuel pump having a brush-less motor is disclosed in U.S. Pat. No. 4,955,790 or JP-A-1-105395. This brush-less motor is controlled by a drive circuit having a comparatively small power switch circuit, in which motor-starting current is limited. However, it is not possible to form such power switch circuit in a one-chip IC unit, because a large capacity is necessary for such a power switch circuit. Usually, about 3–7 ampere is necessary to drive such a fuel pump, while a switch circuit formed on a one-chip IC unit that can switch about 1–2 ampere is only available these days.

SUMMARY OF THE INVENTION

It is a main object of the invention to provide a fuel supply device having inexpensive one-chip IC units.

According to a main aspect of the invention, a fuel supply device is composed a rotary pump, a brush-less motor for driving the rotary pump, and a circuit unit having a plurality of one-chip IC units on which a plurality of switching transistors and a circuit for detecting rotor position are integrally formed. The stator has a plurality of phase coils each of which is connected to a battery through one of the switching transistors of each of the one-chip IC units to be supplied with divided portion of the drive current from one of the switching transistors. Each of the phase coils may be divided to two or more parallel coils having the same phase, and each of the parallel coils is connected to the battery through one of the switching transistors of the one-chip IC units.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

A fuel pump according to a first embodiment of the invention is described with reference to FIGS. 1 and 2.

Figure 1:
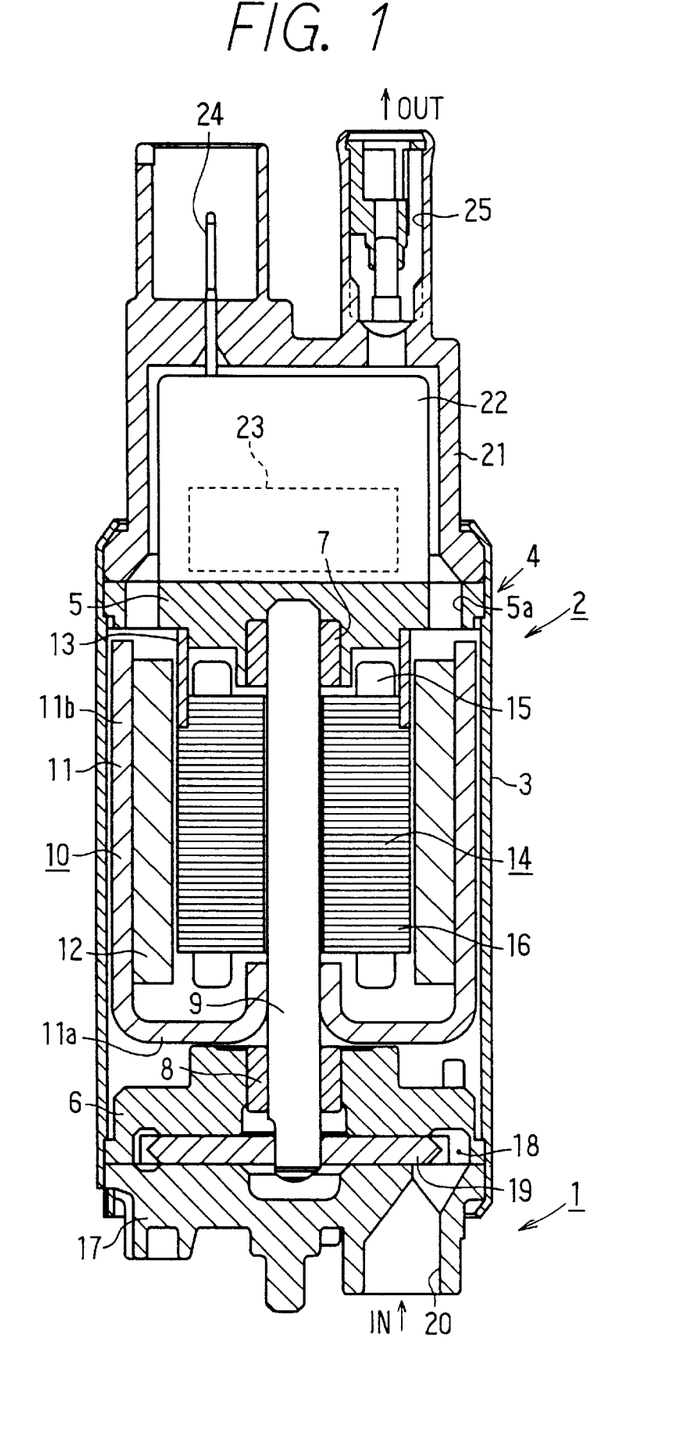
FIG. 1 is a cross-sectional side view of a fuel pump according to a first embodiment of the invention.

In FIG. 1, a fuel pump is composed of pump section 1, motor section 2 and a cylindrical case 3.

In pump section 1, pump body 17 is disposed in case 3 to be in contact with bearing holder 6 to form pump chamber 18 between bearing holder 6 and pump body 17. Impeller 19 is disposed in pump chamber 18 and carried by an end of shaft 9 extending from bearing 8. When impeller 19 rotates, fuel is pumped from fuel inlet 20 formed in pump body 17.

In motor section 2, bearing holders 5, 6 are fixed to opposite ends of case 3 to support bearings 7, 8 respectively which rotatably support shaft 9. Shaft 9 carries rotor 10. Rotor 10 is composed of yoke 11 and permanent magnet 12. Yoke 11 has disk portion 11a and cylindrical portion 11b. Shaft 9 is press-fitted into a center hole of yoke 11. Permanent magnet 12 is fixed to the inner periphery of cylindrical portion 11b by adhesive. Stator-support-ring 13 is fitted to bearing holder 5 to support stator 14. Stator 14 is composed of stator core 16 and stator coil 15. Stator coil 15 is composed of star-connected three, U, V and W, phase coils 30, 31, 32, which are described later. Stator core 16 is disposed radially inner side of permanent magnets 12 at a small gap. Tower case 21 is fixed to case 3 to be in contact with bearing holder 6. Tower case 21 accommodates therein drive circuit case 22 in which drive circuit 23 for driving brush-less motor 4 is disposed. Terminal member 24 extends from tower case 21 to connect drive circuit 23 to an outside electric source. Fuel passage is formed between drive circuit case 23 and tower case 21, so that drive circuit 23 can be cooled by the fuel flowing around drive circuit case effectively.

When impeller 19 rotates, fuel is supplied from pump chamber 18 to the fuel injection nozzles or injectors through a space between yoke 11 and case 3, fuel passage 5a formed in bearing holder 5 and the fuel passage between drive circuit case 23, tower case 21 and fuel outlet 25.

Drive circuit 23 is a sensor-less type circuit in which rotor position is detected from signals sent from U, V, and W phase coils 30, 31, 32. An end of each of U, V, and W phase coils 30, 31, 32 is grounded, and the other end is connected to 12 V battery 35 through respective one-chip IC units 33, 34.

One-chip IC unit 33 is composed of power-MOS transistors 36, 37, 38 and position detecting circuit 39. Transistor 36 is connected in series with phase coil 30, transistor 37 is connected in series with phase coil 31, and transistor 38 is connected in series with phase coil 32. Position detecting circuit 39 has four input terminals connected to one of voltage monitoring portions α, β, γ of phase coils 30, 31, 32 and grounded portion δ thereof respectively. Position detecting circuit 39 has three output terminals connected to the gate of one of transistors 36, 37, 38 respectively. Position detecting circuit 39 detects the position of rotor 10 according to signals α, β, γ, δ and provide one or two of transistors 36, 37, 38 with a signal to switch on, thereby generating a rotating magnetic field. Thus, rotor 10 rotates, and shaft 9 and impeller 19 rotate to increase the fuel pressure. The above operation is well known as disclosed in JP-A 10-136684, for example.

One-chip IC unit 34 is composed of power-MOS transistors 40, 41, 42 and position detecting circuit 43. Transistors 40, 41, 42 are respectively connected to one of phase coils 30, 31, 32 in the manner same as the above. Position detecting circuit 43 also has four input terminals and three output terminals connected in the manner same as position detecting circuit 39.

Figure 2:
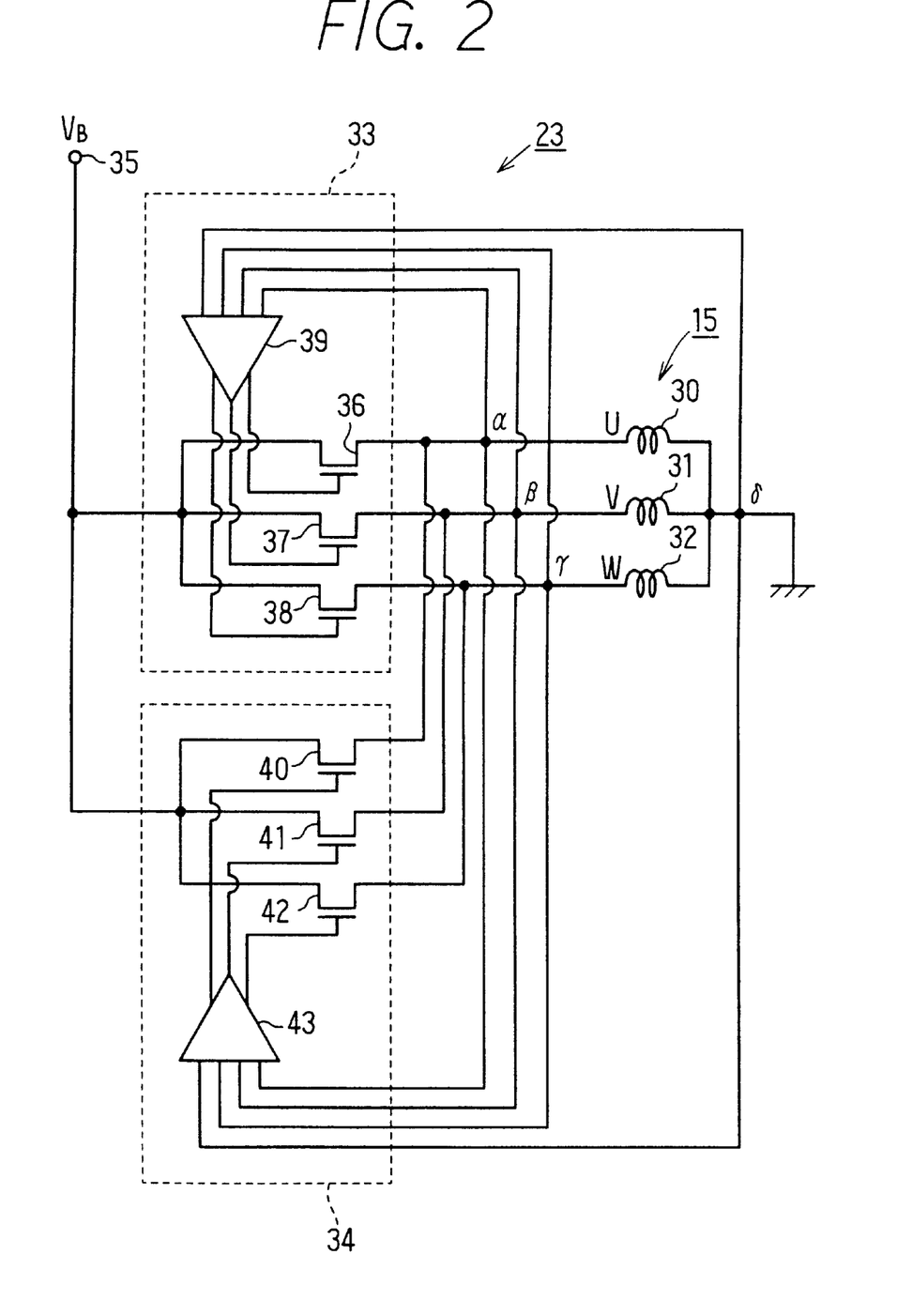
FIG. 2 is a circuit diagram of a drive circuit of the fuel pump illustrated in FIG. 1.
Figure 8:
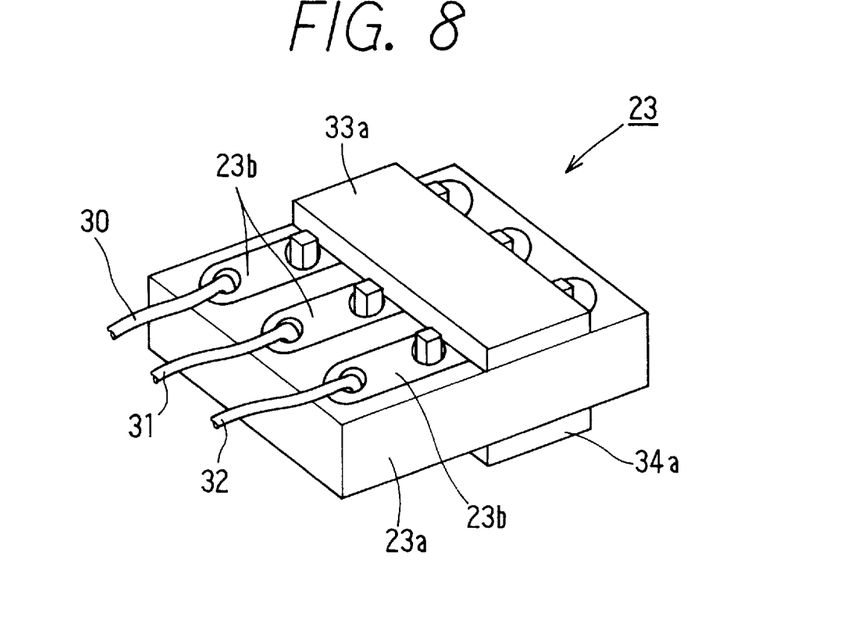
FIG. 8 is a schematic perspective view of packages and a socket in connection according to the invention.

Each of one-chip IC units 33, 34 is held in one of ceramic dual in-line packages 33a, 34a and connected by socket 23a in parallel with each other between power source terminal 35 and stator coil 15 as shown in FIG. 2 and FIG. 8. As shown in FIG. 8, Socket 23a has three connector members 23b molded with insulating material to be insulated from one another. Each of connector members 23b has three holes for the connection, and packages 33a, 34a are fixed to opposite surfaces of socket 23a respectively. Thus, transistors 36, 40 and one (for signal α) of the input terminals of position detecting circuit 39 are connected to U-phase coil 30 in parallel with each other, transistors 37, 41 and another (for signal β) of the input terminals of position detecting circuit 39 are connected to V-phase coil 31 in parallel with each other, and transistor 38, 42 and another (for signal γ) of input terminals of position detecting circuit 39 are connected to W-phase coil 32 in parallel with each other. As a result, U-phase coil 30 is supplied with drive current through transistors 36, 40, V-phase coil 31 is supplied with drive current through transistors 37, 41, and W-phase coil is supplied with drive current through transistors 38, 42.

The fuel pump operates as follows.

When a battery voltage is applied to one-chip IC units 33, 34, three phase coils 30, 31, 32 are energized through two one-chip IC units 33, 34. Therefore, the drive current (e.g. 4 A) necessary to drive the fuel pump is divided into a half (e.g. 2 A).

Because the drive current is shared by two one-chip IC units 33, 34 and is reduced to a small amount, one-chip IC units 33, 34 can be provided at a low cost. The capacity of drive circuit of the fuel pump can be increased by increasing number of one-chip IC units easily. That is, 6 A-fuel pump can be controlled by three one-chip IC units, and 8 A-fuel pump can be controlled by four one-chip IC units.

Second Embodiment

A fuel pump according to a second embodiment of the invention is described with reference to FIGS. 3 and 4.

Figure 4:
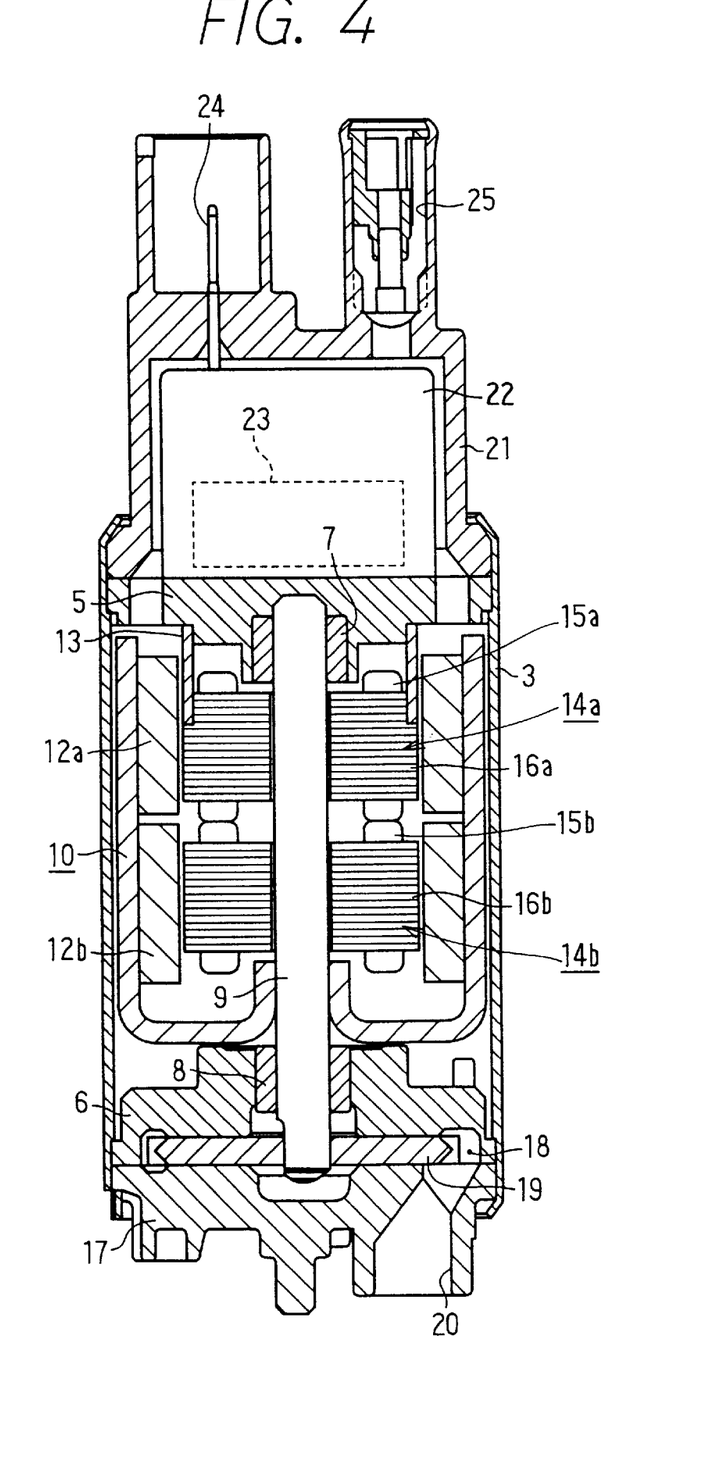
FIG. 4 is a cross-sectional view of the fuel pump according to the second embodiment.

The fuel pump according to the second embodiment has rotor 10 having divided permanent magnets 12a, 12b, and corresponding two stators 14a, 14b as shown in FIG. 4. That is, stator coil 15 of the fuel pump according to the first embodiment is divided to two parallel stator coils, first stator coil 15a and second stator coil 15b. First stator coil 15a is composed of U-phase coil 30a, V-phase coil 31a and W-phase coil 32a, and second stator coil 15b is composed of U-phase coil 30b, V-phase coil 31b and W-phase coil 32b. That is, the fuel pump according to the second embodiment has two parallel phase coils for each phase.

Figure 3:
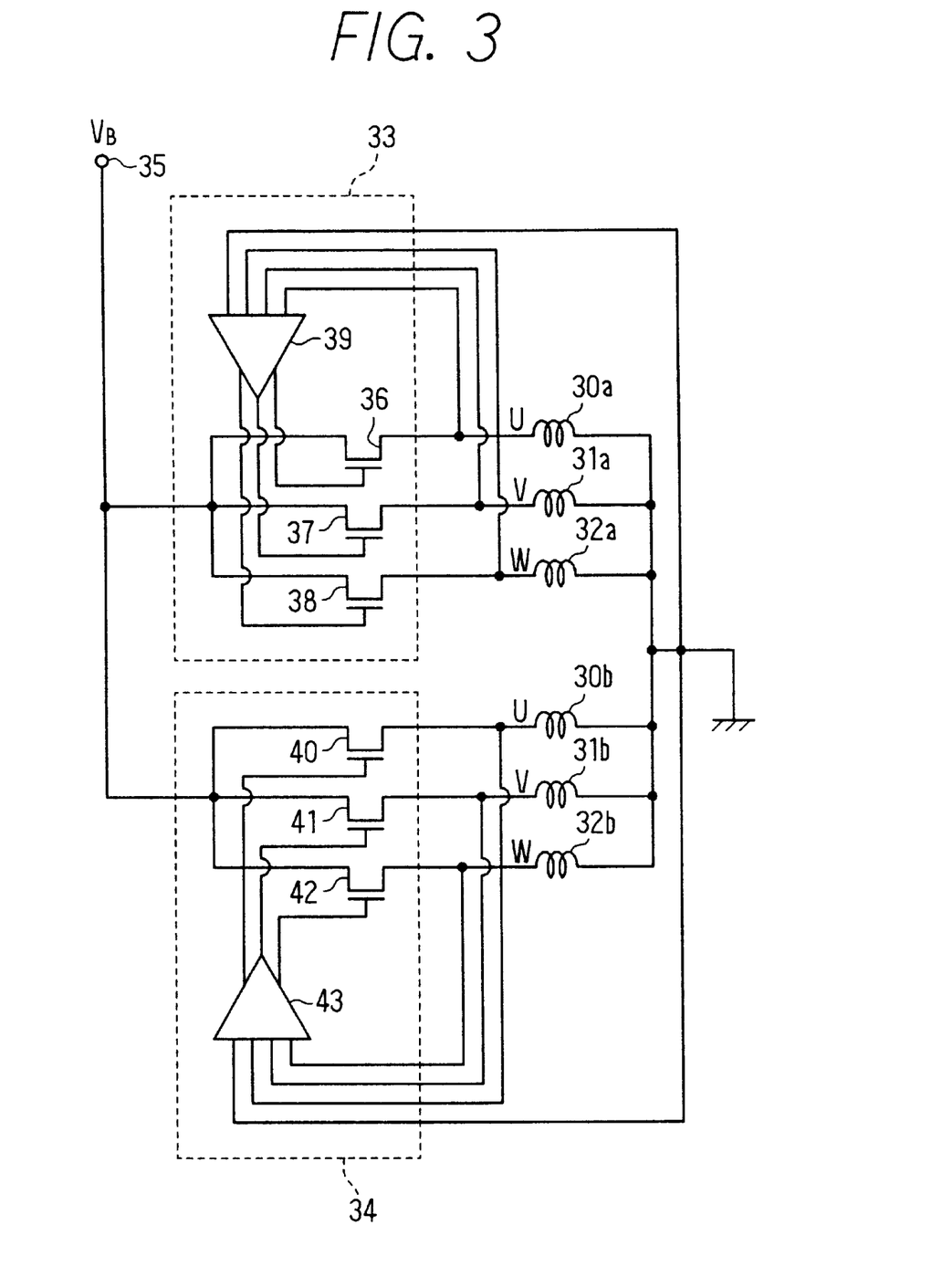
FIG. 3 is a circuit diagram of a drive circuit of a fuel pump according to a second embodiment.

As shown in FIG. 3, U-phase coil 30a is connected to transistor 36, and U-phase coil 30b is connected to transistor 40. V-phase coil 31a is connected to transistor 37, and V-phase coil 31b is connected to transistor 41. W-phase coil 32a is connected to transistor 38, and W-phase coil 32b is connected to transistor 42. Thus, two one-chip IC units 33, 34 are respectively connected between one of stator coils 15a, 15b and a battery or power source.

The number of turns of each of the phase coils 30a, 30b, 31a, 31b, 32a, 32b is approximately a double of the number of turns of one of the phase coils 30, 31, 32 of the fuel pump according to the first embodiment. Thus, drive current supplied to the fuel pump is shared by each of phase coils 30a, 30b, 31a, 31b, 32a, 32b, so that each of one-chip IC units 33, 34 only has to share a half amount of the drive current.

Other portions are substantially the same as portions of the fuel pump according to the first embodiment.

Because the drive current is divided by two one-chip IC units 33, 34 and reduced to a small amount, one-chip IC units 33, 34 can be provided at a low cost. The capacity of drive circuit of the fuel pump can be increased by increasing number of one-chip IC units and the number of stators easily. That is, 6 A-fuel pump can be controlled by three one-chip IC units in combination with three stators, and 8 A-fuel pump can be controlled by four one-chip IC units in combination with four stators.

Third Embodiment

Figure 5:
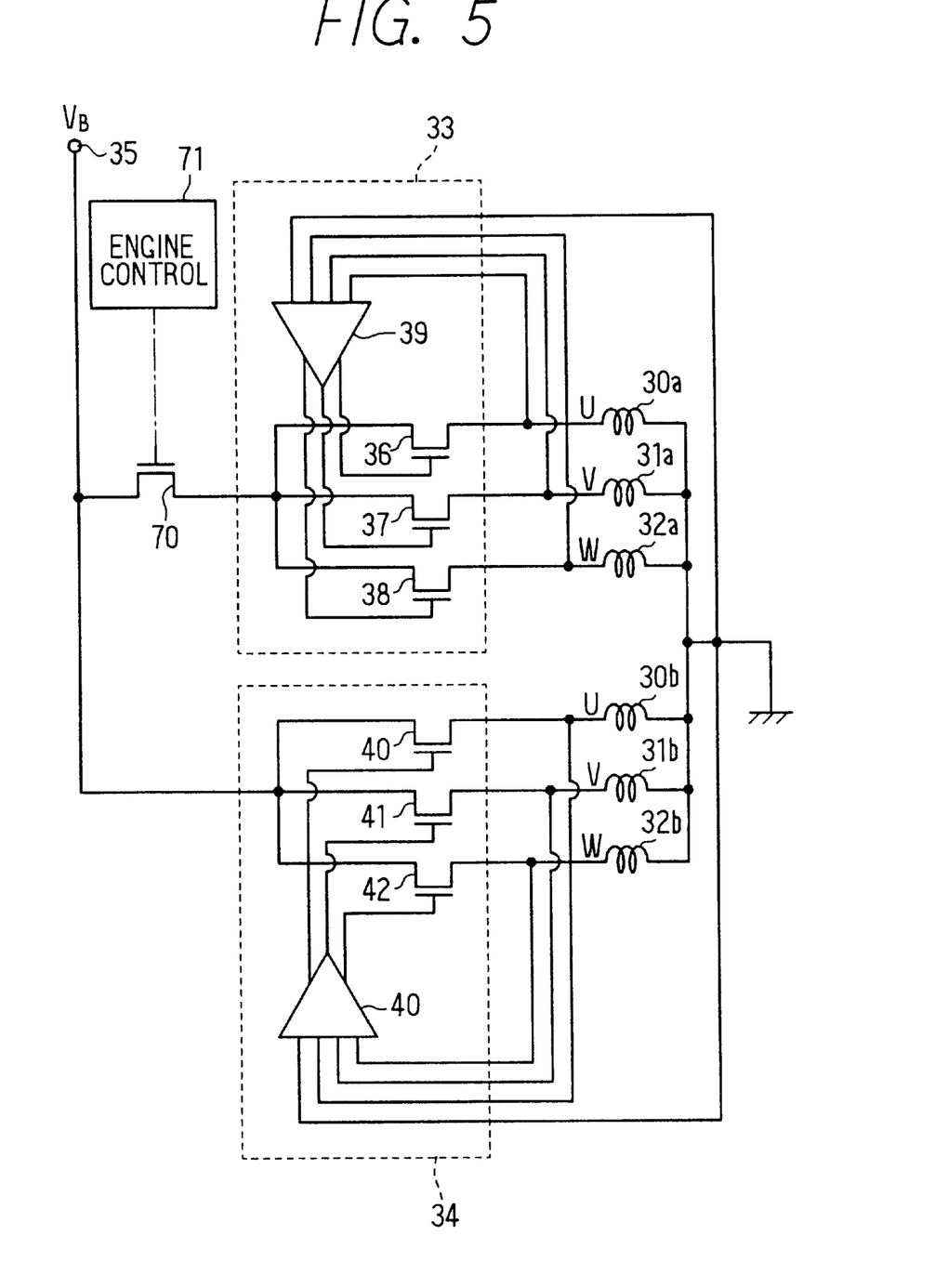
FIG. 5 is a circuit diagram of a fuel pump according to a third embodiment of the invention.
Figure 6:
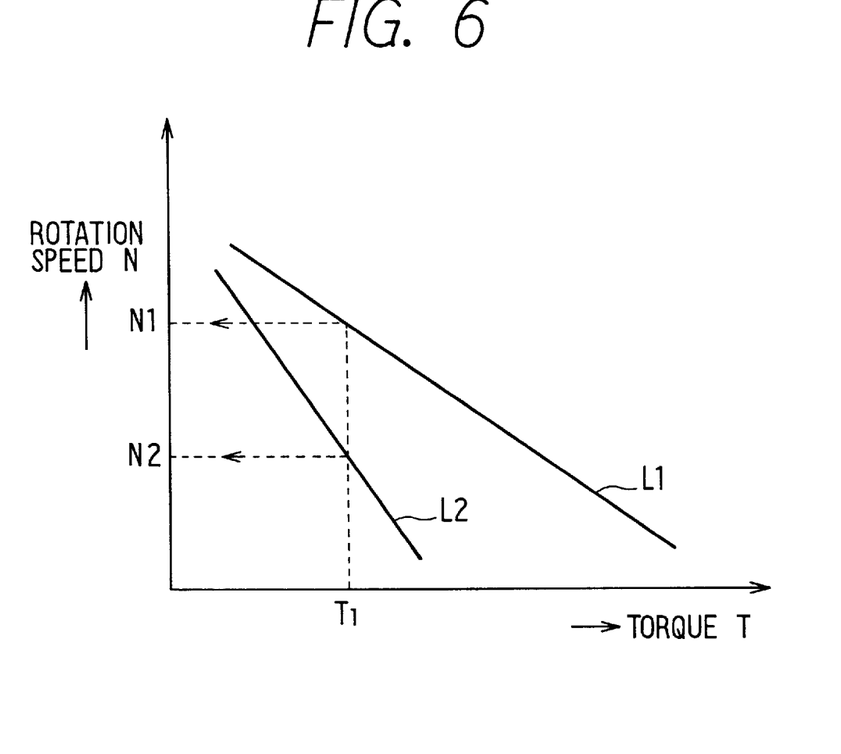
FIG. 6 is a graph showing relationship between torque and rotation speed of the fuel pump according to the third embodiment.

A fuel pump according to a third embodiment of the invention is described with reference to FIGS. 5 and 6.

A switching transistor 70 is connected between one-chip IC unit 33 and the power source. Transistor 70 has a control gate connected to an engine controller 71, which detects an engine load.

Transistor 70 is turned off to reduce the number of the coils in operation to a half thereof when the engine load becomes low. Thus, the output torque characteristic of the fuel pump is changed from line L1 to line L2 as shown in FIG. 6, thereby reducing power consumption of the fuel pump.

Fourth Embodiment

Figure 7:
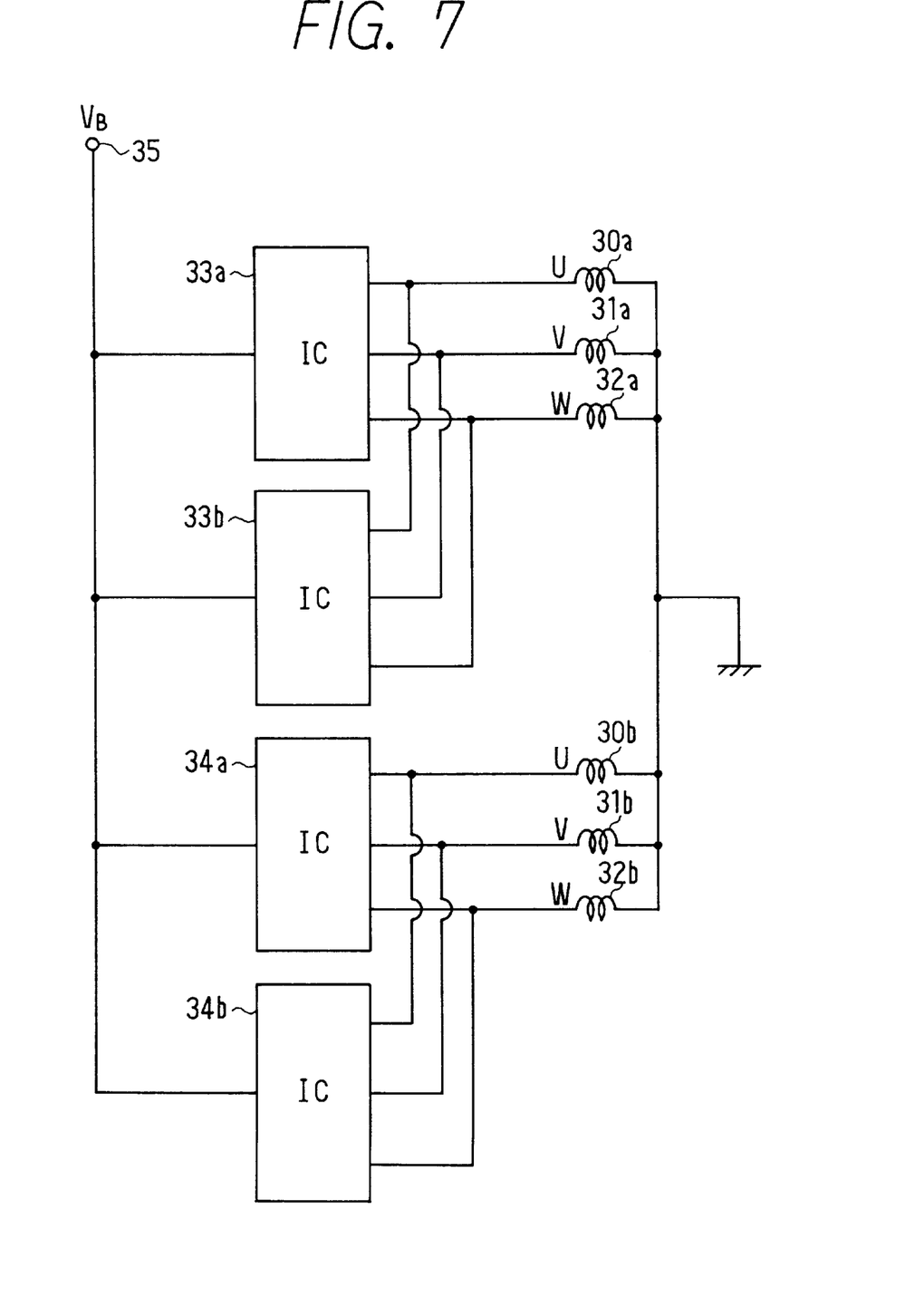
FIG. 7 is a circuit diagram of the drive circuit of a fuel pump according to a fourth embodiment of the invention.

A fuel pump according to a fourth embodiment of the invention is described with reference to FIG. 7.

Stator 14 of the fuel pump according to the first embodiment is divided into two in the manner similar to the second embodiment. Each of phase coils 30a, 31a, 32a is connected to two one-chip IC units 33a, 33b, and each of phase coils 30b, 31b, 32b is connected to two one-chip IC units 34a, 34b in the manner similar to the first embodiment. Consequently, each of one-chip units 33a, 33b, 34a, 34b only has to share ¼ of the drive current supplied to the fuel pump.

The fuel pump having three phase coils can be substituted by a fuel pump having two phase coils. The sensor-less type brush-less motor can be substituted by a brush-less motor having a sensor such as a Hall element or a phototransistor. The impeller can be any type of rotary pump.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A fuel supply device to be connected to a power source comprising:

a case;

a rotary pump, disposed in said case, for supplying a controlled amount of fuel to outside;

a brush-less motor disposed in said case and having a stator and a rotor connected to said rotary pump; and a circuit unit disposed in said case for supplying drive current to said brush-less motor, said circuit unit having a plurality of one-chip IC units on which a plurality of switching transistors to be connected to said power source and a circuit for detecting position of said rotor are integrally formed, wherein said stator has a plurality of phase coils each of which is connected to one of said plurality of switching transistors of each of said plurality of one-chip IC units to be supplied with divided portion of said drive current from said one of said plurality of switching transistors.

2. The fuel supply device as claimed in claim 1, wherein each of said plurality of phase coils is divided to a plurality of parallel coils having the same phase, and each of said plurality of parallel coils is connected to one of said plurality of switching transistors.

3. The fuel supply device as claimed in claim 1 further comprising means, connected between said power source and one of said plurality of one-chip IC units, for cutting said divided drive current when said controlled amount of fuel becomes small.

4. The fuel supply device as claimed in claim 1 further comprising a fuel passage, disposed in said case to surround said circuit unit, for supplying said fuel from said rotary pump to outside.

* * * * *